United States Patent [19]

Umemoto

[11] Patent Number: 5,227,764
[45] Date of Patent: Jul. 13, 1993

[54] ELECTROMAGNETIC PROXIMITY SENSOR

[75] Inventor: Toshiaki Umemoto, Iwaki, Japan

[73] Assignee: Alpine Electronics, Inc., Tokyo, Japan

[21] Appl. No.: 777,868

[22] Filed: Oct. 15, 1991

[30] Foreign Application Priority Data

Nov. 6, 1990 [JP] Japan .................................. 2-300457

[51] Int. Cl.⁵ .................... G08B 13/18; B60R 25/10
[52] U.S. Cl. .................................. 340/552; 340/426; 340/511
[58] Field of Search .................... 340/552–554, 340/539, 566, 825.57, 426, 511, 512, 561, 531, 551, 533; 367/93–94; 342/27–28; 341/176; 331/65; 455/100

[56] References Cited

U.S. PATENT DOCUMENTS

| | | | |
|---|---|---|---|
| 3,974,328 | 8/1976 | Thomas et al. | 342/27 X |
| 4,155,078 | 5/1979 | Bowling et al. | 340/561 |
| 4,570,247 | 2/1986 | Walker et al. | 367/93 |
| 4,581,606 | 4/1986 | Mallory | 340/539 |
| 4,897,630 | 1/1990 | Nykerk | 340/426 |
| 4,940,964 | 7/1990 | Dao | 340/539 X |

Primary Examiner—Thomas Mullen
Attorney, Agent, or Firm—Guy W. Shoup; Norman R. Klivans

[57] ABSTRACT

An electromagnetic proximity sensor for car security systems includes an electromagnetic wave radiating section adapted to oscillate in a predetermined high frequency range to outwardly radiate an electromagnetic wave; a clutter component extractor for extracting a low frequency clutter component generated in the electromagnetic wave by the approach or movement of an object; a level comparing section, to which is supplied a low frequency clutter component signal corresponding to the extracted low frequency clutter component so as to be compared with a predetermined reference level and which is adapted to emit a sensor signal when the clutter component signal supplied is beyond a predetermined level; and an oscillating operation intermitting section, to which is supplied a pulse signal of a variable duty ratio and of a frequency higher than that of the low frequency clutter component and which is adapted to intermit the oscillating operation of the electromagnetic wave radiating section on the basis of this pulse signal. The electromagnetic proximity sensor may also include a reference level generating section, to which is supplied a pulse signal of a variable duty ratio and which generates a reference level voltage adapted to change its level in accordance with the duty ratio of the pulse signal and supplies it to the level comparing section.

12 Claims, 7 Drawing Sheets

FIRST REFERENCE LEVEL

LOW-FREQUENCY CLUTTER COMPONENT SIGNAL (2)

ELECTROMAGNETIC PROXIMITY SENSOR

BACKGROUND OF THE INVENTION

1. Field of the Invention

The present invention relates to an electromagnetic proximity sensor and, in particular, to an electromagnetic proximity sensor which detects any low frequency clutter component generated in an electromagnetic wave by the approach or movement of a human being or any other object.

2. Description of the Related Art

An electromagnetic proximity sensor, which utilizes electromagnetic waves to detect the approach or movement of a human being or a metal object, is used, for example, in automatic doors of convenience stores or in car security systems. This electromagnetic proximity sensor radiates an electromagnetic wave in the microwave range into the space around it, and detects any low-frequency clutter component generated in the electromagnetic wave when a human being, a metal object, etc. approaches it or moves within an area around it, thereby detecting the approach or movement of such an object.

Figure 7:
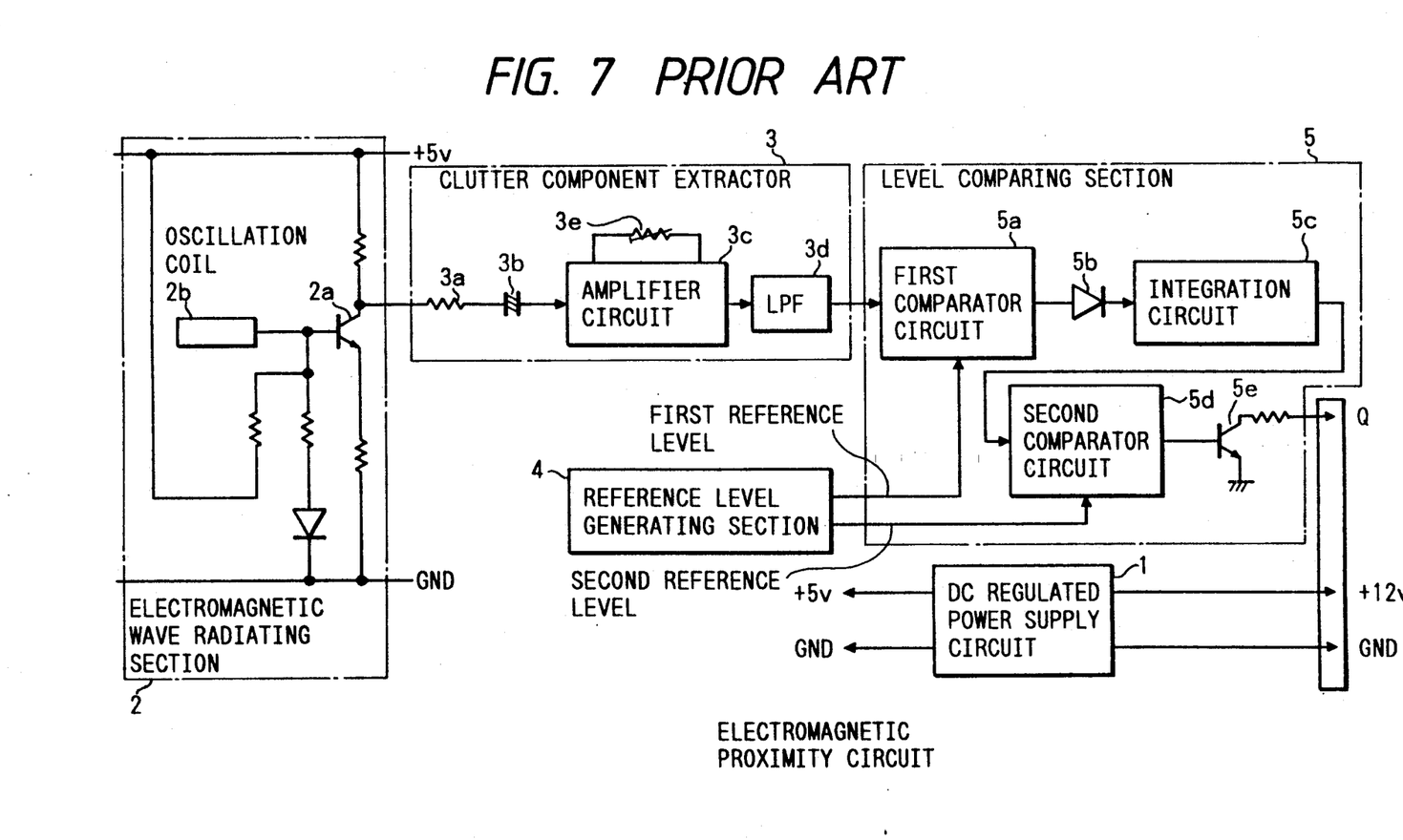
FIG. 7 is a schematic diagram showing the construction of a conventional electromagnetic proximity sensor.

FIG. 7 is a circuit diagram showing an example of an electromagnetic proximity sensor for a car security system, which sensor is installed at a predetermined position inside a vehicle. The reference numeral 1 indicates a DC regulated power supply circuit, which is adapted to produce a stabilized voltage of +5V upon a +12V input. The reference numeral 2 indicates an electromagnetic wave radiating section, which has a GaAsFET 2a for oscillating microwaves, an oscillation coil 2b consisting of a distributed constant circuit, etc. This electromagnetic wave radiating section 2 effects oscillation in a high-frequency range, for example, of 2.45 GHz. The oscillation coil 2b then serves as an antenna and radiates an electromagnetic wave into the secured area around the vehicle to be protected. When a person approaches the vehicle, a low frequency clutter is generated in the radiated electromagnetic wave. This clutter causes the antenna load of the electromagnetic wave radiating section 2 to fluctuate, with the low-frequency clutter component being carried by the collector voltage of the GaAsFET 2a. The reference numeral 3 indicates a clutter component extractor, which includes a detection resistor 3a for detecting any fluctuation in the collector voltage of the GaAsFET 2a, a capacitor 3b for cutting DC current, an amplifier circuit 3c for amplifying the fluctuating component of the collector voltage, and a low-pass filter 3d for extracting the low-frequency clutter component carried by the collector voltage of the GaAsFET 2a to emit a low frequency clutter component signal. The reference numeral 4 indicates a reference level generating section, and the reference numeral 5 indicates a level comparing section, where the extracted electromagnetic wave clutter component signal is supplied to be compared with a predetermined reference level. When a low frequency clutter component signal of a level higher than the reference level has continued for a certain period of time, the level comparing section 5 emits a sensor signal. This level comparing section 5 includes: a first comparator circuit 5a, which compares the low frequency clutter component signal extracted by the clutter component extractor 3 with a predetermined first reference level and emits an H level signal as long as the low frequency clutter component signal is beyond the first reference level; a reverse blocking diode 5b; an integration circuit 5c, which integrates the output of the reverse blocking diode 5b; and a second comparator circuit 5d, which emits an H level signal when the output of the integration circuit 5c has exceeded a predetermined second reference level, turning on an open collector transistor 5e to emit an L level sensor signal Q.

Figure 8:
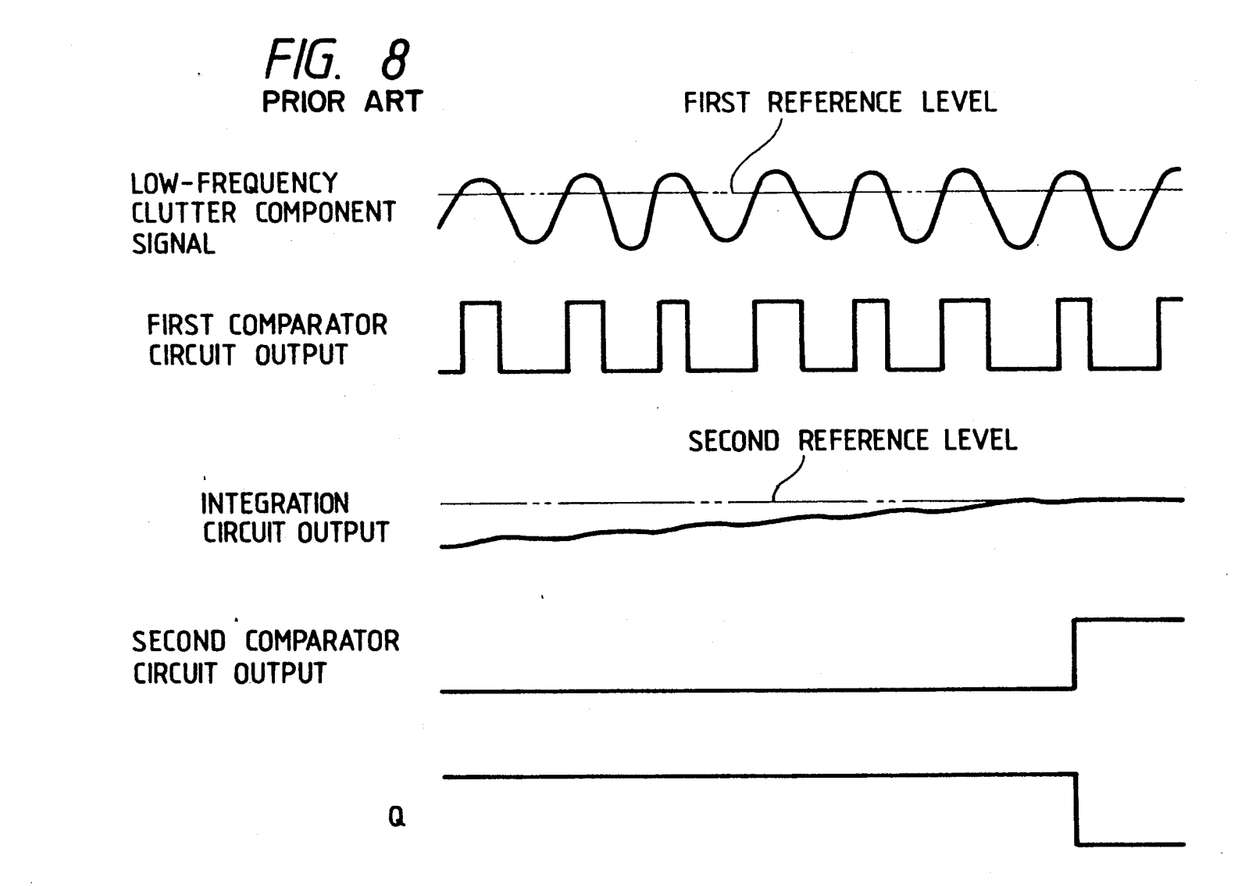
FIG. 8 is a waveform diagram illustrating the operation of the level comparing section shown in FIG. 7.

FIG. 8 shows the operational waveforms in the level comparing section 5. The sensor signal Q is only emitted when the input of a low frequency clutter component signal which is at a level beyond the first reference level has continued for a certain period. When the input is of a short duration, no sensor signal is emitted.

The collector side of the open collector transistor 5e is connected through a cable to a pull-up input resistor in a security system body (not shown) installed at a predetermined position inside the vehicle. When the open collector transistor 5e is turned on, an L level sensor signal Q is supplied to a security control unit to effect a predetermined alarm control operation.

The optimum sensitivity of the electromagnetic proximity sensor is different for different types of automobiles, so that it is necessary in the prior art to perform sensor sensitivity adjustment in accordance with the automobile type when mounting the sensor on the vehicle.

Conventionally, this sensor sensitivity adjustment has been effected by turning a semi-fixed resistor 3e provided in the amplifier circuit 3c to vary the gain of the amplifier circuit 3c.

Thus, with the prior-art technique described above, the sensor sensitivity adjustment has been effected by means of the semi-fixed resistor 3e of the electromagnetic proximity sensor, which means it has been necessary for the adjusting operator to get into the vehicle to turn this semi-fixed resistor 3e of the electromagnetic proximity sensor and then get out of the vehicle to check whether the alarm can be triggered or not. Since this has to be performed repeatedly, the conventional manner of adjustment is rather tedious.

SUMMARY OF THE INVENTION

It is accordingly an object of the present invention to provide an electromagnetic proximity sensor which allows the sensor sensitivity adjustment to be performed outside the vehicle.

In order to achieve the above object, according to one aspect of the present invention, there is provided an electromagnetic proximity sensor comprising: an electromagnetic wave radiating section adapted to oscillate in a predetermined high frequency range to outwardly radiate an electromagnetic wave; a clutter component extractor for extracting a low frequency clutter component generated in the electromagnetic wave by the approach or movement of an object; a level comparing section, to which is supplied a low frequency clutter component signal corresponding to the extracted low frequency clutter component so as to be compared with a predetermined reference level and which is adapted to emit an sensor signal when the clutter component signal supplied is beyond a predetermined level; and an oscillating operation intermitting section, to which is supplied from a source external to the sensor a pulse signal of a variable duty ratio and of a frequency higher than that of the low frequency clutter component and which is adapted to intermit the oscillating operation of the electromagnetic wave radiating section on the basis of this pulse signal.

According to another aspect of the present invention, the above object is achieved by providing an electromagnetic proximity sensor which comprises a reference level generating section, to which is supplied from a source external to the sensor a pulse signal of a variable duty ratio and which generates a reference level voltage adapted to change its level in accordance with the duty ratio of this pulse signal and supplies it to the above-mentioned level comparing section.

In one aspect of the present invention, supplying from a source external to the sensor a pulse signal of a variable duty ratio and of a frequency higher than that of the low frequency clutter component causes the oscillating operation of the electromagnetic wave radiating section to intermit, varying the level of the low frequency clutter component signal required for emitting a sensor signal in the level comparing section, whereby it is possible to effect sensor sensitivity adjustment from a source external to the sensor.

In another aspect of the present invention, supplying from a source external to the sensor a pulse signal of a variable duty ratio causes the generation of a reference level voltage the level of which changes in accordance with the duty ratio of this pulse signal, the reference level voltage being supplied to the level comparing section, whereby it is possible to effect sensor sensitivity adjustment from a source external to the sensor the sensor.

DESCRIPTION OF THE PREFERRED EMBODIMENTS

Figure 1:
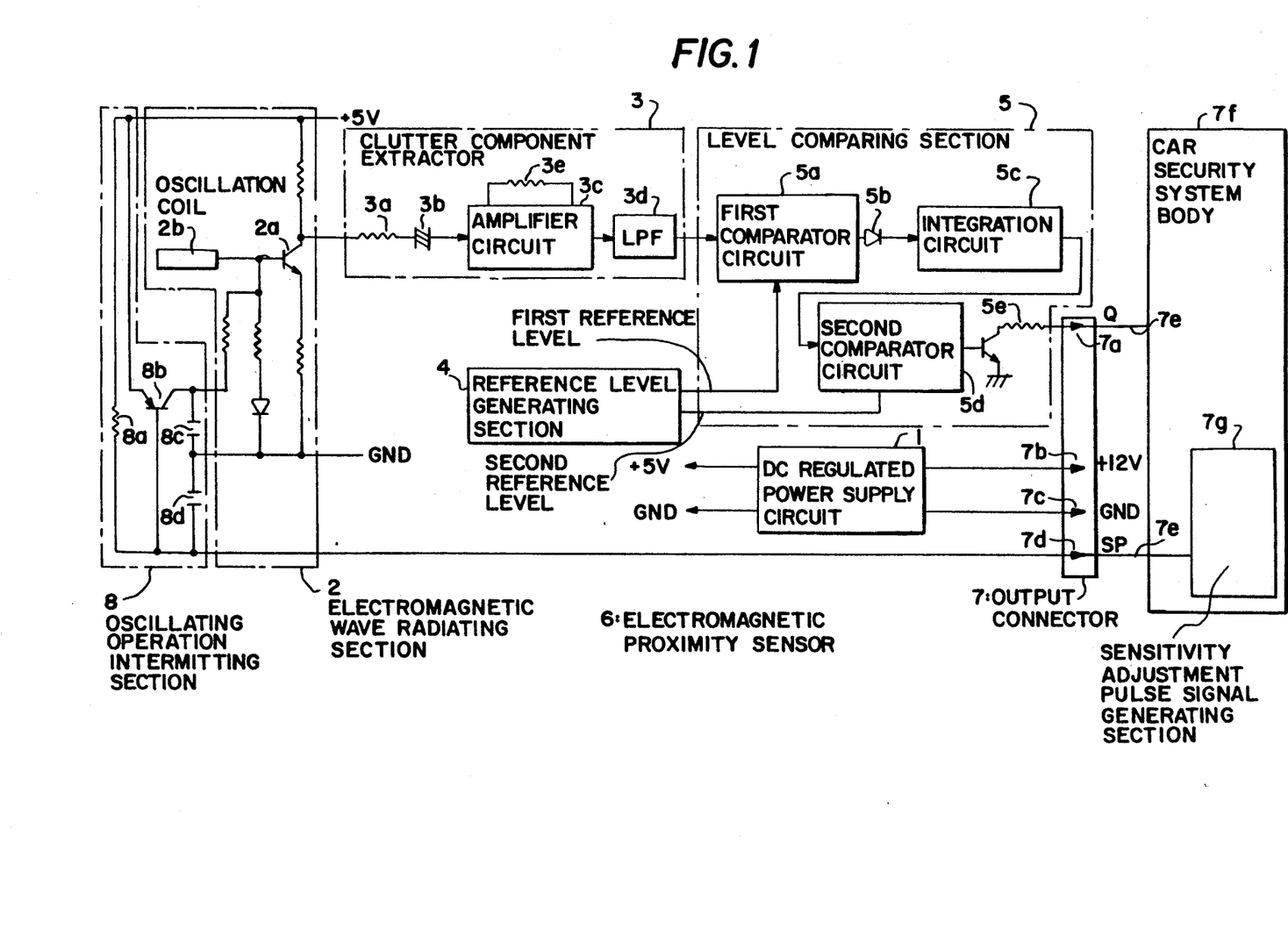
FIG. 1 is a schematic block diagram showing the construction of an electromagnetic proximity sensor in accordance with an embodiment of this invention.

FIG. 1 is a schematic block diagram showing an electromagnetic proximity sensor for car security systems in accordance with an embodiment of the present invention. In the drawing, the components which are same as those of FIG. 7 are referred to by the same reference numerals.

Figure 2:
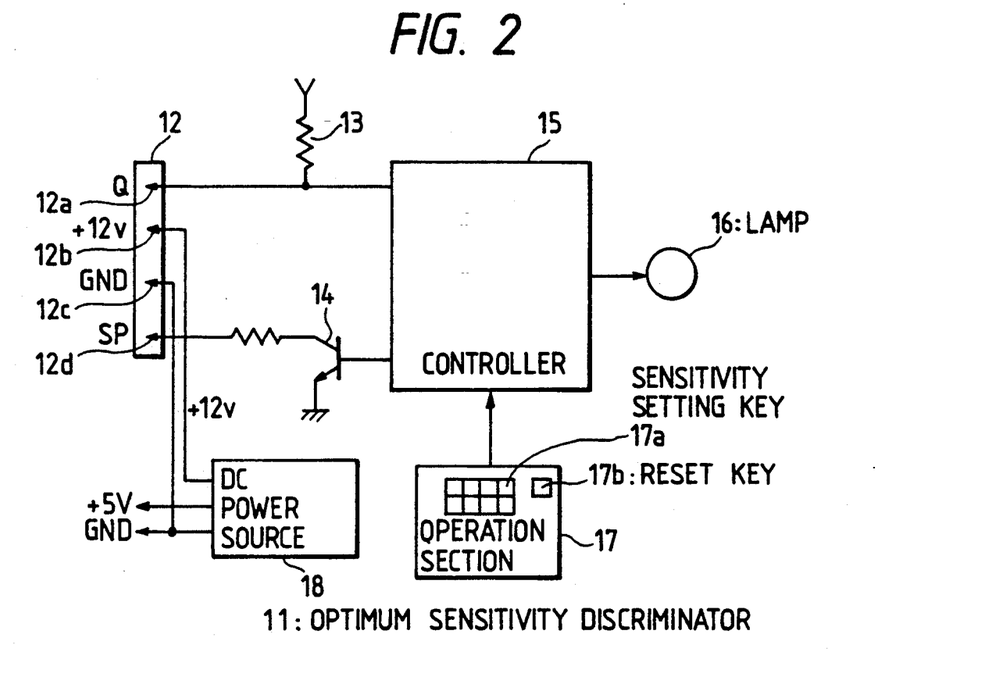
FIG. 2 is a schematic diagram showing the construction of an optimum sensitivity discriminator.

The reference numeral 6 indicates an electromagnetic proximity sensor, and the reference numeral 7 indicates an input/output connector attached to the case of the electromagnetic proximity sensor 6, which can be connected through a cable 7e to a car security system body 7f or an optimum sensitivity discriminator 11, which is shown in FIG. 2. The reference numerals 7a, 7b, 7c and 7d respectively indicate a sensor signal output terminal, a +voltage input terminal, a grounding terminal, and a sensitivity adjustment pulse signal input terminal.

The car security system body or the optimum sensitivity discriminator 11 effects, for example, open-collector emission of a sensitivity adjustment pulse signal SP.

The reference numeral 8 indicates an oscillating operation intermitting section, to which a sensitivity adjustment pulse signal is supplied from sensitivity adjustment pulse signal generating section 7g through the sensitivity adjustment pulse signal terminal 7d of the input/output connector 7, and which causes the oscillating operation of the electromagnetic wave radiating section 2 to intermit in accordance with this pulse signal. The reference numerals 8a and 8b respectively indicate a pull-up resistor to which the sensitivity adjustment pulse signal SP is supplied and a transistor to the base of which the sensitivity adjustment pulse signal is supplied. The reference numerals 8c and 8d indicate capacitors. When the sensitivity adjustment pulse signal is at an L level, the transistor 8b and the GaAsFET 2a are turned on to cause the electromagnetic wave radiating section 2 to oscillate. When the sensitivity adjustment pulse signal is at an H level, the transistor 8b and the GaAsFET 2a are turned off to stop the oscillation of the electromagnetic wave radiating section 2. Thus, the electromagnetic wave radiating section 2 intermittently performs the oscillating operation in accordance with the duty ratio of the sensitivity adjustment pulse signal.

The frequency of the sensitivity adjustment pulse signal is much higher than that of the low frequency clutter component generated in the electromagnetic wave by the approach or movement of a human body, so that the fluctuating component of the collector voltage of the GaAsFET 2a, generated by the intermitting of the oscillating operation, is cut by the low-pass filter 3d of the low frequency clutter component extractor 3 and is not supplied to the level comparing section 5.

The gain of the amplifier circuit 3c of the clutter component extractor 3 is fixed.

The other components of this electromagnetic proximity sensor are constructed in completely the same fashion as those of FIG. 7.

FIG. 2 is a schematic block diagram showing the construction of the optimum sensitivity discriminator 11, which can be connected to the electromagnetic proximity sensor through a cable.

The reference numeral 12 indicates an input/output connector which is connected through a cable to the input/output connector 7 of the electromagnetic proximity sensor. This input/output connector 12 includes a sensor signal input terminal 12a, a +voltage output terminal 12b, a grounding terminal 12c, and a sensitivity adjustment pulse signal output terminal 12d. The reference numeral 13 indicates a pull-up resistor which constitutes a sensor signal input circuit, and the reference numeral 14 indicates an open collector transistor serving as a sensitivity adjustment pulse signal output circuit. The reference numerals 15 and 16 respectively indicate a microcomputer-based controller and a lamp. The reference numeral 17 indicates an operating section, which includes sensitivity setting keys through which sensitivity adjustment is effected in eight steps, and a reset key 17b. The controller 15 is adapted to effect duty ratio variation in eight steps through operation by the sensitivity adjustment setting keys 17a. When the controller 15 supplies a sensitivity adjustment pulse signal SPi (i=1~8) of a frequency, for example, of 125 Hz, to the side of the electromagnetic proximity sensor 6 through the open collector transistor 14, and a sensor signal Q through the pull-up resistor 13, the lamp 16 comes on. The reference numeral 18 indicates a DC power source including a 12V battery and a DC-DC converter adapted to obtain 5V DC power from 12V.

Figure 3:
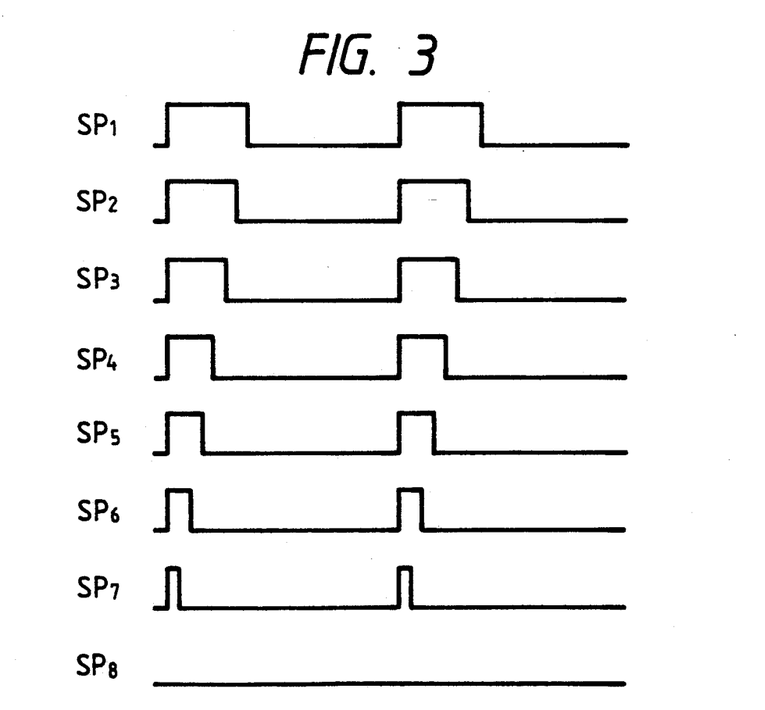
FIG. 3 is a waveform diagram showing pulse signals for sensitivity adjustment.

FIG. 3 shows the waveforms of the sensitivity adjustment pulse signals $SP_1$ through $SP_8$ emitted by the optimum sensitivity discriminator 11. The sensitivity level of these signals ranges from sensitivity level 1 (the minimum sensitivity) to sensitivity level 8 (the maximum sensitivity). Of these signals, the sensitivity adjustment pulse signal $SP_8$ continuously remains at the L level.

Figure 4:
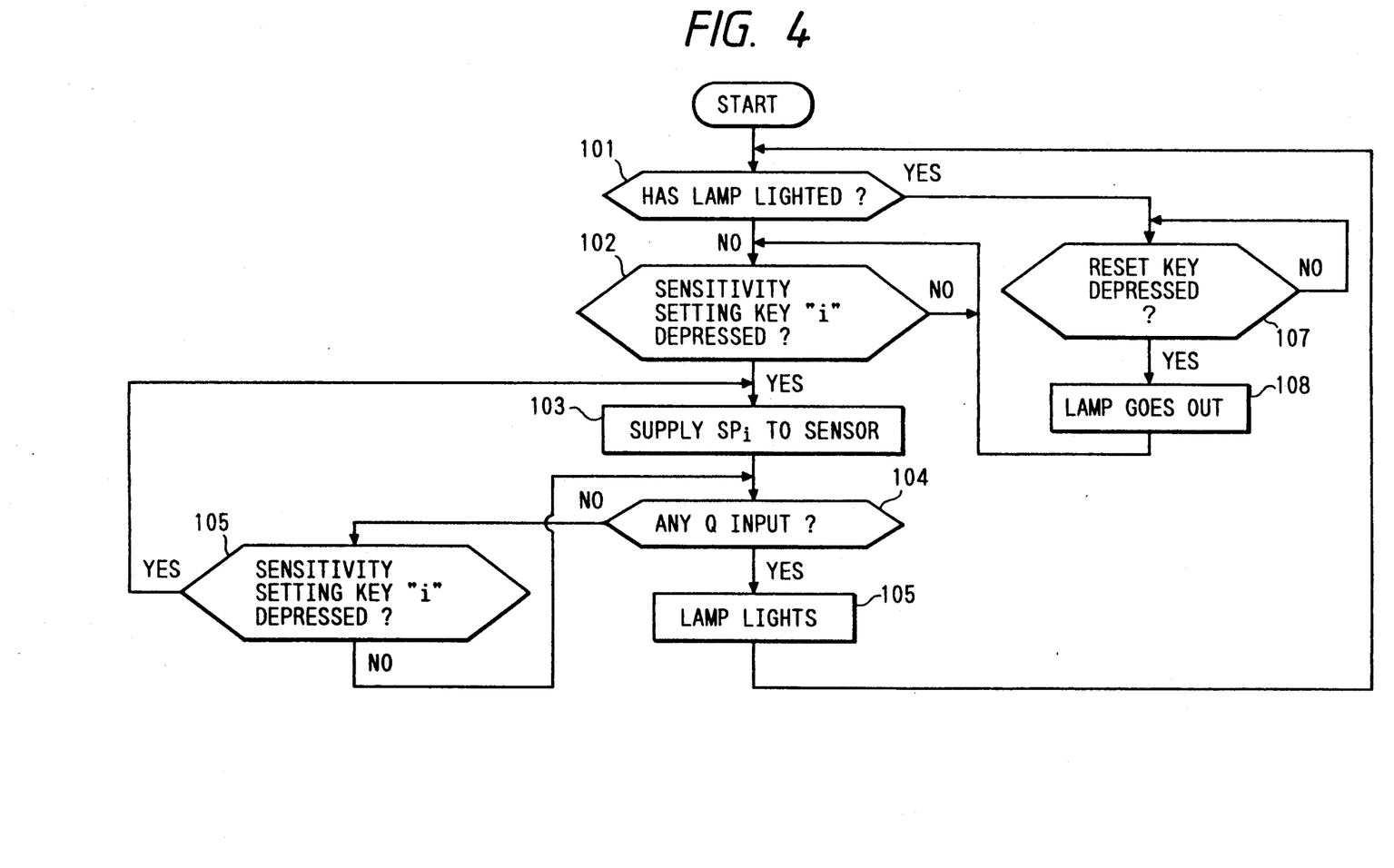
FIG. 4 is a flowchart illustrating the operation of the controller shown in FIG. 2.

Next, the operation of this embodiment will be described with reference to the flowchart of FIG. 4 illustrating the operation of the controller 15, and the waveform diagram of FIG. 5.

After it has been installed at a predetermined position in the vehicle, the electromagnetic proximity sensor 6 is connected through a cable to the optimum sensitivity discriminator 11. If, with the operator standing at a position remote from the vehicle and with the lamp 16 being off, the "1" key of the sensitivity setting keys 17a is depressed, the controller 15 emits a sensitivity adjustment pulse signal $SP_1$ of 125 Hz in duty ratio, which corresponds to sensitivity level 1 (the maximum sensitivity), through the open collector transistor 14 (steps 101 to 103).

The sensitivity adjustment pulse signal $SP_1$ is supplied to the electromagnetic proximity sensor 6, that is, to the base of the transistor 8b of the oscillating operation intermitting section 8. When the sensitivity adjustment pulse signal $SP_1$ is at the L level, the transistor 8b and the GaAsFET 2a are turned on to effect oscillation, radiating an electromagnetic wave outwardly. When the sensitivity adjustment pulse signal $SP_1$ is at the H level, the transistor 8b and the GaAsFET 2a are turned off to stop oscillation, stopping the electromagnetic wave radiation. Since the duty ratio of the sensitivity adjustment pulse signal $SP_1$ is large, the oscillation period is short.

Since the ON/OFF change of the GaAsFET 2a is repeated at 125 Hz, the collector voltage also changes at a period of 125 Hz. This collector voltage is supplied to the clutter component extractor 3, and amplified by the amplifier circuit 3c after the voltage variation has been extracted by the DC cutting capacitor 3b. Since, however, it is cut by the low-pass filter 3d, the collector voltage is not supplied to the level comparing section 5.

When, in this condition, the operator approaches the vehicle and moves around it, a low frequency clutter is generated in the electromagnetic wave radiated to the exterior of the vehicle during the oscillation period to cause a change in the antenna load, with the result that a low frequency clutter component of approximately 10 Hz is carried by the collector voltage of the GaAsFET 2a. This low frequency clutter component is supplied to the clutter component extractor 3, and, after the variation has been extracted by the DC cutting capacitor 3b, it is amplified by the amplifier circuit 3c. It is then transmitted through the low-pass filter 3d and emitted as a low frequency clutter component signal.

The low frequency clutter component signal is supplied to the level comparing section 5, where it is compared with the first reference level by the first comparator circuit 5a, an H level sensor signal being emitted as long as the low frequency clutter component signal is beyond the first reference level. The H level output of the first comparator circuit 5a is integrated by the integration circuit 5c through the reverse blocking diode 5b, and is then compared with the second reference level at the second comparator circuit 5d.

Figure 5:
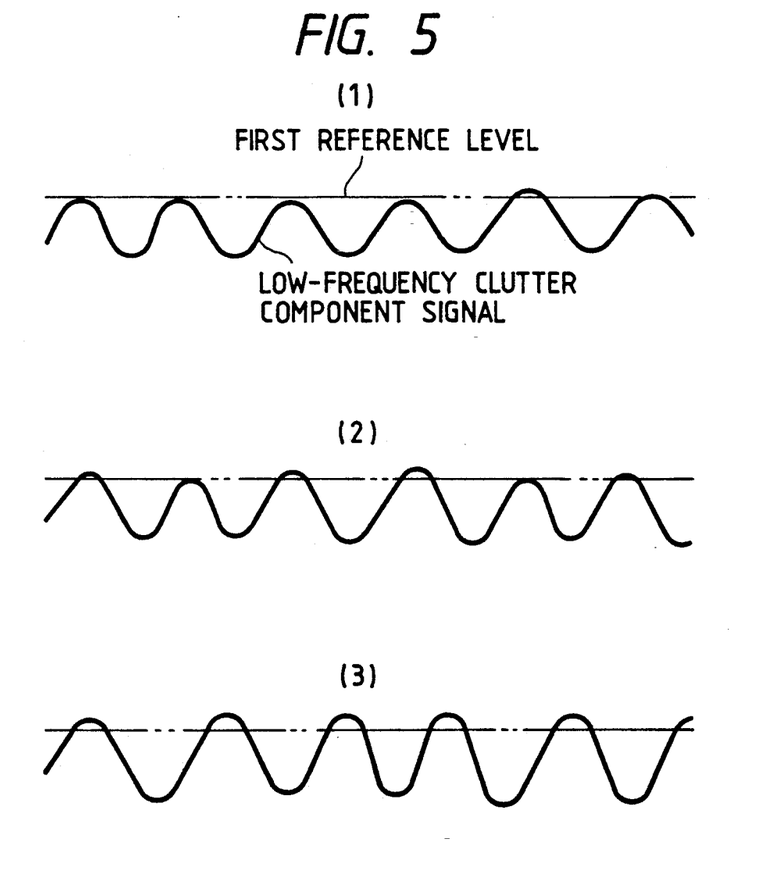
FIG. 5 is a waveform diagram illustrating the electromagnetic proximity sensor shown in FIG. 1.

Since the duty ratio of the sensitivity adjustment pulse signal $SP_1$ is high and the oscillation period of the electromagnetic wave radiating section 2 is short, the level of the low frequency clutter component signal emitted from the clutter component extractor 3 is low and hardly capable of exceeding the first reference level (see FIG. 5(1)). Accordingly, even if the output of the integration circuit 5c remains zero or increases, its speed is low. If the operator stops around the vehicle after having appropriately moved there, the supply of the low frequency clutter component signal to the level comparing section 5 is stopped. Then, the output level of the integration circuit 5c is lowered through discharge, so that if the output peak of the integration circuit 5c remains below the second reference level, the output of the second comparator circuit 5d does not attain the H level, with no sensor signal Q being emitted from the open collector transistor 5e.

Thus, it can be ascertained that sensitivity level 1 is not suitable for a vehicle equipped with the electromagnetic proximity sensor 6.

If, to raise the sensitivity level, the operator depresses the "2" key of the sensitivity setting keys 17a of the optimum sensitivity discriminator 11, the controller 15 causes a sensitivity adjustment pulse signal $SP_2$ corresponding to sensitivity level 2 (see FIG. 3) to be emitted from the open collector transistor 14 at a duty ratio of 125 Hz (steps 104, 105 and 103). The electromagnetic wave radiating section 2 of the electromagnetic proximity sensor 6 intermits the oscillating operation in accordance with the duty ratio of the sensitivity adjustment pulse signal $SP_2$, and the oscillation period becomes somewhat longer. Accordingly, the level of the low frequency clutter component signal supplied to the level comparing section 5 when the operator moves around the vehicle is somewhat higher and exceeds the first reference level from time to time (see FIG. 5(2)), with the rate of output increase of the integration circuit 5c becoming somewhat higher. However, if the output peak of the integration circuit 5c does not attain the second reference level before the operator has stopped after moving around appropriately, no sensor signal Q is emitted.

If, in order to make the sensitivity level still higher, the "3" key of the sensitivity setting keys 17a of the optimum sensitivity discriminator 11 is depressed, the controller 15 causes a sensitivity adjustment pulse signal $SP_3$ corresponding to sensitivity level 3 (see FIG. 3) to be emitted from the open collector transistor 14 at a duty ratio of 125 Hz (steps 104, 105 and 103), whereby the oscillation period of the electromagnetic wave radiating section 2 becomes still longer, and the level of the low frequency clutter component signal supplied to the level comparing section 5 when the operator moves around the vehicle becomes still higher and easily exceeds the first reference level, with the rate of output increase of the integration circuit 5c becoming still higher. When the output peak of the integration circuit 5c attains the second reference level before the operator has stopped moving around the vehicle after appropriately moving around the vehicle, the second comparator circuit 5d emits an H level signal and turns on the open collector transistor 5e, causing it to emit an L level sensor signal Q, which is supplied through a cable to the controller 15 of the optimum sensitivity discriminator 11.

The controller 15, to which the sensor signal Q has been supplied, lights up the lamp 16 (steps 104 and 106). The lighting of this lamp 16 indicates to the operator that sensitivity level 3 is suitable for this vehicle. Accordingly, by connecting the car security system body (not shown) to the electromagnetic proximity sensor 6 and having a sensitivity adjustment pulse signal $SP_3$ corresponding to sensitivity level 3 emitted from a built-in sensitivity adjustment pulse signal generating section (which has a construction similar to those of the operating section 17, the controller 15, and the open collector transistor 14 of the optimum sensitivity discriminator 11) of this car security system body, an optimum sensitivity adjustment suitable for this vehicle can be performed.

If the lamp 16 is not lit even with sensitivity level 3, the sensitivity level setting keys 17a of the operating section 17 may be sequentially operated so as to successively raise the sensitivity level as: 4, 5, ..., 8.

The lamp 16 can be turned off by depressing the reset key 17b (steps 107 and 108).

In accordance with the above-described embodiment, a sensitivity adjustment pulse signal of a variable duty ratio is applied from the outside of the electromagnetic proximity sensor, whereby the sensitivity adjustment operation can be performed at a position remote from the sensor, thus eliminating the trouble of repeatedly getting into the vehicle to perform sensitivity adjustment where the electromagnetic proximity sensor is located and then getting out of the vehicle to check whether the adjustment has been properly made.

It is possible to impart a remote control function to the car security system body so that sensitivity adjustment pulse signals of different duty ratios can be generated in the sensitivity adjustment pulse signal signal generating section through remote switching operation, whereby it is possible to perform the sensor sensitivity adjusting operation, with the electromagnetic proximity sensor and the car security system body being connected to each other from the first.

Figure 6:
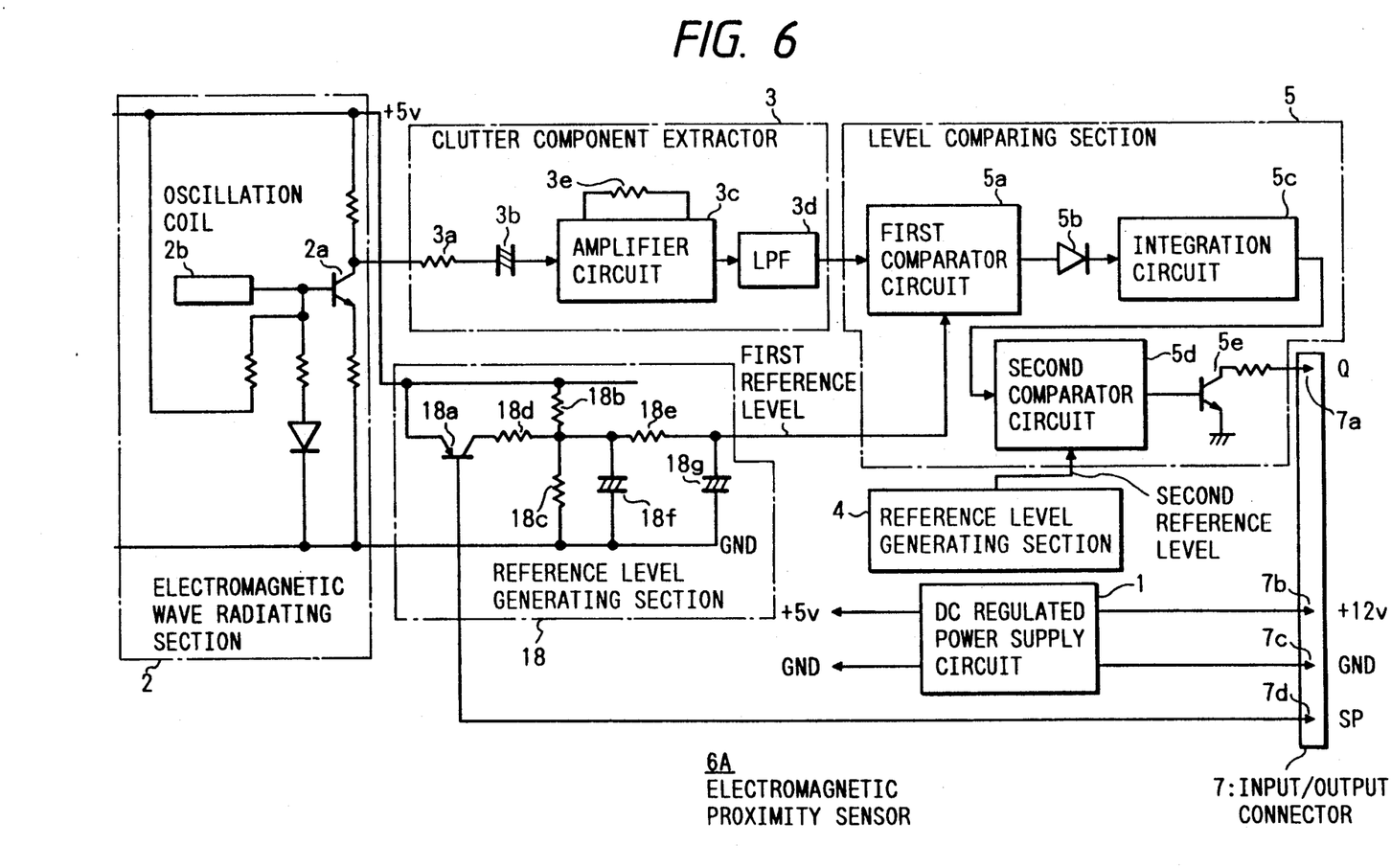
FIG. 6 is a schematic block diagram showing the construction of an electromagnetic proximity sensor in accordance with another embodiment of this invention.

While in the above-described embodiment the frequency of the sensitivity adjustment pulse was 125 Hz, this should not be construed as restrictive. Other values of fixed or variable frequency will also serve the purpose as long as they are higher than that of the low frequency clutter component. Further, while in the above-described embodiment the sensor signal, the sensitivity adjustment pulse signal, etc. were emitted through open-collector emission, it is also possible for them to be emitted in some other way. Further, while in the above embodiment changes in sensitivity can be effected by intermitting the oscillating operation of the electromagnetic wave radiating section 2 in accordance with the H/L changes in the sensitivity adjustment pulse signals, it is also possible to effect changes in sensitivity by varying the first reference level of the level comparing section 5, as in the case of the electromagnetic proximity sensor 6A which is shown in FIG. 6. In FIG. 6, the reference numeral 18 indicates a reference level generating section, which includes a transistor 18a, resistors 18b through 18e, and capacitors 18f and 18g. The resistors 18b and 18c exhibit substantially the same resistance, which is also the case with the resistors 18d and 18e. The resistance value of the resistor 18d is much smaller than that of the resistor 18b. A sensitivity adjustment pulse signal is supplied to the base of the transistor 18a. When the sensitivity adjustment pulse signal is at the L level, the transistor 18a is turned on, with the capacitor 18f being charged mainly through the resistor 18d to a voltage which is determined by the resistors 18b, 18c and 18d. When the sensitivity adjustment pulse signal is at the H level, the transistor 18a is turned off, with the capacitor 18f being discharged to attain a voltage which is determined by the resistors 18b and 18c. The voltage of the capacitor 18f is smoothed by the resistor 18e and the capacitor 18g, and is supplied to the first comparator circuit 5a of the level comparing section 5 as a first reference level voltage. Thus, when the duty ratio of the sensitivity adjustment pulse signal is high (i.e., when the H period is long), the first reference level voltage emitted from the reference level generating section 18 is low, and, when the duty ratio is low, the first reference level voltage is high, which means the sensor sensitivity can be varied by a sensitivity adjustment pulse signal of a variable duty ratio. The system of this embodiment differs from that of FIG. 3 in that the sensitivity adjustment pulse signal $SP_1$ corresponds to the maximum sensitivity and the sensitivity adjustment pulse signal $SP_8$ to the minimum sensitivity.

Thus, in one aspect of the present invention, supplying from the outside a pulse signal of a variable duty ratio and of a frequency higher than that of the low frequency clutter component causes the oscillating operation of the electromagnetic wave radiating section to intermit, varying the level of the low frequency clutter component signal required for emitting a sensor signal in the level comparing section, whereby it is possible to effect sensor sensitivity adjustment outside the sensor.

In another aspect of the present invention, supplying from the outside a pulse signal of a variable duty ratio causes the generation of a reference level voltage the level of which changes in accordance with the duty ratio of this pulse signal, the reference level voltage being supplied to the level comparing section, whereby it is possible to effect sensor sensitivity adjustment outside the sensor.

What is claimed is:

1. An electromagnetic proximity sensor comprising: an electromagnetic wave radiating section adapted to oscillate in a predetermined high frequency range to outwardly radiate an electromagnetic wave; a clutter component extractor for extracting a low frequency clutter component generated in the electromagnetic wave by the approach or movement of an object; a level comparing section, to which is supplied a low frequency clutter component signal corresponding to the extracted low frequency clutter component so as to be compared with a reference level and which is adapted to emit a sensor signal when said clutter component signal supplied exceeds the reference level; and an oscillating operation intermitting section, to which is supplied a pulse signal of a variable duty ratio and of a frequency higher than that of said low frequency clutter component and which is adapted to intermit the oscillating operation of said electromagnetic wave radiating section in response to said pulse signal.

2. An electromagnetic proximity sensor comprising: an electromagnetic wave radiating section adapted to oscillate in a predetermined high frequency range to outwardly radiate an electromagnetic wave; a clutter component extractor for extracting a low frequency clutter component generated in the electromagnetic wave by the approach or movement of an object; a level comparing section, to which is supplied a low frequency clutter component signal corresponding to the extracted low frequency clutter component so as to be compared with a reference level and which is adapted to emit a sensor signal when said clutter component signal supplied exceeds the reference level; and a reference level generating section, to which is supplied a pulse signal of a variable duty ratio and which generates the reference level with the level thereof changed in accordance with the duty ratio of said pulse signal and which supplies the reference level to said level comparing section.

3. A car security system comprising:
an electromagnetic proximity sensor including:
an electromagnetic wave radiating section adapted to oscillate in a predetermined high frequency range to outwardly radiate an electromagnetic wave; a clutter component extractor for extracting a low frequency clutter component generated in the electromagnetic wave by the approach or movement of an object; a level comparing section, to which is supplied a low frequency clutter component signal corresponding to the extracted low frequency clutter component so as to be compared with a predetermined reference level and which is adapted to emit a sensor signal when said clutter component signal supplied exceeds the predetermined reference level; and an oscillating operation intermitting section, to which is supplied a pulse signal of a variable duty ratio and of a frequency higher than that of said low frequency clutter component and which is adapted to intermit the oscillating operation of said electromagnetic wave radiating section in response to said pulse signal; and
a car security system unit having a sensitivity adjustment pulse signal generating section.

4. A car security system as claimed in claim 3, wherein said car security system unit is endowed with a remote control function, enabling said sensitivity adjustment pulse signal generating section to generate sensitivity adjustment pulse signals of different duty ratios by remote switching operation.

5. A car security system comprising:
an electromagnetic proximity sensor including:
an electromagnetic wave radiating section adapted to oscillate in a predetermined high frequency range to outwardly radiate an electromagnetic wave; a clutter component extractor for extracting a low frequency clutter component generated in the electromagnetic wave by the approach or movement of an object; a level comparing section, to which is supplied a low frequency clutter component signal corresponding to the extracted low frequency clutter component so as to be compared with a reference level and which is adapted to emit a sensor signal when said clutter component signal supplied exceeds the reference level; and a reference level generating section, to which is supplied a pulse signal of a variable duty ratio and which generates the reference level with the level thereof changed in accordance with the duty ratio of said pulse signal and supplies the reference level to said level comparing section; and
a car security system unit having a sensitivity adjustment pulse signal generating section.

6. A car security system as claimed in claim 11, wherein said car security system unit is endowed with a remote control function, enabling said sensitivity adjustment pulse signal generating section to generate sensitivity adjustment pulse signals of different duty ratios by remote switching operation.

7. An electromagnetic proximity sensor comprising:
an electromagnetic wave radiating section adapted to oscillate in a predetermined frequency range to outwardly radiate an electromagnetic wave; a clutter component extractor for extracting a particular frequency range clutter component generated in the electromagnetic wave by the approach or movement of an object; a level comparing section, to which is supplied a clutter component signal corresponding to the extracted particular frequency range clutter component so as to be compared with a reference level and which is adapted to emit a sensor signal when said clutter component signal supplied exceeds the reference level; and an oscillating operation intermitting section, to which is supplied a pulse signal and which is adapted to intermit the oscillating operation of said electromagnetic wave radiating section in response to said pulse signal.

8. An electromagnetic proximity sensor comprising:
an electromagnetic wave radiating section adapted to oscillate in a predetermined frequency range to outwardly radiate an electromagnetic wave; a clutter component extractor for extracting a particular frequency range clutter component generated in the electromagnetic wave by the approach or movement of an object; a level comparing section, to which is supplied a clutter component signal corresponding to the extracted particular frequency range clutter component so as to be compared with a reference level and which is adapted to emit a sensor signal when said clutter component signal supplied exceeds the reference level; and a reference level generating section, to which is supplied a pulse signal and which generates the reference level with the level thereof changed in accordance with said pulse signal and which supplies the reference level to said level comparing section.

9. A car security system comprising:
an electromagnetic proximity sensor including:
an electromagnetic wave radiating section adapted to oscillate in a predetermined frequency range to outwardly radiate an electromagnetic wave; a clutter component extractor for extracting a particular frequency range clutter component generated in the electromagnetic wave by the approach or movement of an object; a level comparing section, to which is supplied a clutter component signal corresponding to the extracted particular frequency range clutter component so as to be compared with a reference level and which is adapted to emit a sensor signal when said clutter component signal supplied is beyond the reference level, and an oscillating operation intermitting section, to which is supplied a pulse signal and which is adapted to intermit the oscillating operation of said electromagnetic wave radiating section in response to said pulse signal; and
a car security system unit having a sensitivity adjustment pulse signal generating section.

10. A car security system as claimed in claim 9, wherein said car security system unit is endowed with a remote control function, enabling said sensitivity adjustment pulse signal generating section to generate sensitivity adjustment pulse signals of different duty ratios by remote switching operation.

11. A car security system comprising:
an electromagnetic proximity sensor including:
an electromagnetic wave radiating section adapted to oscillate in a predetermined frequency range to outwardly radiate an electromagnetic wave; a clutter component extractor for extracting a particular frequency range clutter component generated in the electromagnetic wave by the approach or movement of an object; a level comparing section, to which is supplied a clutter component signal corresponding to the extracted particular frequency range clutter component so as to be compared with a reference level and which is adapted to emit a sensor signal when said clutter component signal supplied exceeds the reference level; and a reference level generating section, to which is supplied a pulse signal and which generates the reference level with the level thereof changed in accordance with said pulse signal and which supplies the reference level to said level comparing section; and
a car security system unit having a sensitivity adjustment pulse signal generating section.

12. A car security system as claimed in claim 11, wherein said car security system unit is endowed with a remote control function, enabling said sensitivity adjustment pulse signal generating section to generate sensitivity adjustment pulse signals of different duty ratios by remote switching operation.

* * * * *